US006489895B1

(12) United States Patent
Apelman

(10) Patent No.: US 6,489,895 B1
(45) Date of Patent: Dec. 3, 2002

(54) FAIL-SAFE LEAK DETECTION AND FLOOD PREVENTION APPARATUS

(76) Inventor: Steven P. Apelman, 23 Royalston La., Centereach, NY (US) 11720-1414

(*) Notice: Subject to any disclaimer, the term of this patent is extended or adjusted under 35 U.S.C. 154(b) by 0 days.

(21) Appl. No.: 09/977,810

(22) Filed: Oct. 15, 2001

(51) Int. Cl.[7] ............................................. G08B 21/00
(52) U.S. Cl. ........................ 340/605; 340/602; 340/605; 73/40.7; 137/312; 200/61.04; 200/61.05; 200/61.06
(58) Field of Search ................................. 340/605, 604, 340/602, 531, 525; 200/61.04, 61.05, 61.06; 137/312, 314; 73/40.7, 23.2; 324/464

(56) References Cited

U.S. PATENT DOCUMENTS

| 5,240,022 A | * | 8/1993 | Franklin | 340/605 |
| 5,655,561 A | * | 8/1997 | Wendel et al. | 137/79 |
| 6,147,613 A | * | 11/2000 | Doumit | 340/605 |
| 6,259,370 B1 | * | 7/2001 | Takenoshita | 340/605 |
| 6,404,343 B1 | * | 6/2002 | Andou et al. | 340/605 |

* cited by examiner

Primary Examiner—Daniel J. Wu
Assistant Examiner—Davetta W. Goins
(74) Attorney, Agent, or Firm—Edwin D. Schindler

(57) ABSTRACT

A fail-safe leak detection and flood prevention apparatus includes an induced current, transconductive darlington amplifier and tuned-frequency standing water detector mounted at a lowest point of a potential leak plane for sensing variations of standing water conditions on the potential leak plane, and an induced current amplifier in communication with the standing water detector. A sensitivity control device for controlling sensitivity of the standing water detector for humidity, or dampness, level and for detecting a standing water leak; the sensitivity control device being in communication with the induced current amplifier. A latching relay driver connected to the sensitivity control device with the latching relay driver being able to memorize a leak condition when electrical power is lost. A control rectifier driven by the latching relay driver, with the control rectifier driving a 120-volt AC line voltage load. A normally closed 120-volt AC line operated fail-safe water cutoff device is connected with the control rectifier, so that when the standing water detector becomes wet, the induced current generated by the standing water detector changes the transconductance of the input darlington amplifier causing the induced current amplifier to indicate the leak condition, which removes electrical power from the normally closed 120-volt AC line operated fail-safe water cutoff device for shutting off water flow.

8 Claims, 6 Drawing Sheets

FAIL-SAFE LEAK DETECTION AND FLOOD PREVENTION APPARATUS

BACKGROUND OF THE INVENTION

1. Technical Field of the Invention

The present invention relates to a fail-safe leak detection and flood prevention apparatus.

More particularly, the present invention relates to an apparatus for leak detection and flood prevention that can easily be installed in a residence, a commercial business, or an industrial workplace, to totally eliminate the uncontrolled flooding caused by ruptured pipes, cracked heating system boilers, water heaters and failed inlet hoses connected to devices such as washing machines. The invention further addresses the need for radio-controlled remote sensing of leaks and water shut-offs where the "leak detector to control unit" wiring is impractical or otherwise impossible to accommodate.

The present invention allows for the ready prevention of many, if not most, types of common household floods, thereby providing significant economic savings to homeowners and the insurance industry.

2. Description of the Prior Art

The prior art encompasses many leak detection and water flow control devices, however, all such prior art systems are either mechanically complex or are not capable of detecting very small leaks, as can the present invention, and are uneconomical to operate and thereby not readily acceptable to the general public.

Illustrative of the prior art is Quintana, U.S. Pat. No. 6,178,569, which discloses a toilet overflow prevention device wherein a toilet is electrically wired for the detection of possible flooding conditions. Aesthetically, this prior art apparatus has the drawback of having a commode with visible electrical wires connected to it.

Jurado, U.S. Pat. No. 5,967,759, teaches a flood control device having a sensor and means for water removal. The apparatus of this patent uses a sensor to detect standing water, but requires expensive plumbing and water removal pumps to accomplish flood protection. The drawback of the system of U.S. Pat. No. 5,967,759 is that it requires water extraction plumbing that must be installed, in addition to the system's overall lack of control of incoming flooding water.

Isaacson, Jr., U.S. Pat. No. 5,782,263, and Simpkins, U.S. Pat. No. 5,979,493, disclose devices that attempt to prevent flood control by means of determining a leak by measuring a flow of water in a supply pipe by using a type of electromechanical flow meter and determining whether too much water has flowed over a specified time, i.e., that a leak or uncontrolled flood is taking place, thereby shutting down the water inlet. The drawback in both U.S. Pat. Nos. 5,782,263 and 5,979,493 is that there is no precise way to predetermine how much water is "too much" for any specific application. The practical drawback of these systems is that all of the predetermined water that the systems are set to detect must flow through the pipes in order for the systems to shut down the incoming water, which may already be more than enough water to cause extensive damage. These types of systems have the further drawbacks of not being able to detect small leaks.

By contrast, the present invention offers residential, business and industrial consumers an inexpensive, and fail-safe manner of shutting off incoming water the moment the detector senses an alarm condition. The sensitivity of the inventive system can be adjusted for humidity, or dampness, level and for detecting a standing water leak.

In further contrast to the prior art, the present invention operates on the fail-safe basis of having a water inlet continuously powered "on," whereas the prior art operates by powering a water cutoff for stopping the flow of water. This prior art approach, i.e., of powering the water cutoff to stop the incoming flow of water, fails to protect the residence or business intended for protection in the event of a power failure, again, in contrast to the present invention.

Additional benefits of the present invention include the fact that installation can be accomplished by the most inexperienced of home or business owners and their personnel, and requires no special tools for doing so. An important feature of the present invention is that it possesses the ability to provide for radio controlled water detectors where hard wiring the detectors to the main control unit is impractical or impossible.

SUMMARY OF THE INVENTION

It is, therefore, an object of the present invention to provide a simple and economical solution to the prevention of uncontrolled flooding, and to do so at times that no human contact with the system is possible.

A further object of the present invention is to provide a leak detection apparatus by which standing water is detected, along with the ability of the sensitivity of the apparatus to be adjusted so that dampness or high humidity conditions will not cause a false shutoff of the inlet water, and still be able to detect very small leaks in contrast to the prior art.

It is, yet, a further object of the present invention to provide a leak detection apparatus, which includes means for shutting off of a water inlet and recording, or memorizing, the alarm state, even in the event of an electrical power loss.

The fail-safe leak detection and flood prevention apparatus of the present invention includes a modular design that is powered from a standard 120 VAC wall outlet, and requires no special tools or understanding of plumbing to place this system into operation.

The standing water detector is, preferably, a 1–10 microamps darlington amplified circuit (though other circuits may also be utilized), so that when wet, this circuit causes a change in transconductance that is proportional to the level of standing water. The control unit of the invention interprets the transconductance shift caused by the standing water as a standing water condition, and as such, thereby causes the inlet water cutoff to close immediately.

The foregoing transconductance darlington amplifier circuit standing water detectors can be linked to the control system for the invention by a radio frequency transmitter-receiver. This is particularly advantageous where direct wiring of the water detector to the control system is extremely difficult, economically impractical, or, quite literally, impossible.

It is also important that a standing water condition may drain through floor drains and could deceive a lesser system into signalling that an "error" condition has been repaired. By contrast, the present invention shuts off the incoming water on an alarm state of a standing water condition, and the water inlet will remain off, even if electrical power is lost, or if the standing water condition should drain off. This is in contrast to prior art devices not having such a feature, whereby the inlet water would turn back on if the standing water were to drain off, thereby causing the flooding cycle to repeat over and over again. The present invention shuts off the incoming water on an alarm state of a standing water condition, and will not allow the incoming water line to be reactivated unless the system is manually reset.

The present invention may also include multiple direct-wired and radio-linked standing water detectors for further leak damage control in multiple locations without the need to install additional water cutoffs.

In a preferred embodiment of the present invention, the a fail-safe leak detection and flood prevention apparatus includes a feature for allowing a user to interface with a standard telephone line, and with that connection, call a preset number to alarm the receiver of the flooding condition that has been detected. The control system performs its task by means of a non-human contact; in that the system wiring is not interfaced by the user, either visually or by physical contact. However, it must be stated that exceptional care has been taken in this invention to use power means that provide for ultra-safe operating levels, that should such human contact occur, no possible injury could result—such as a child or pet touching the standing water detectors or by placing them in their mouths.

The fail-safe leak detection and flood prevention apparatus of the present invention would, preferably, comprise the following:

At least one transconductance darlington amplifier circuit standing water detector on the floor of the lowest point of the leak plane to be protected; the transconductance shift of the darlington amplifier circuit is, preferably, 1–10 microamps. The standing water detector can either be direct-wired or radio-linked to the control unit. The control unit is wired to the water inlet cutoff. The internal power source within the control unit will drive the cutoff when a standing water condition exists. A sensitivity control is included, and appropriately set, for humidity, dampness and/or standing water conditions, for selecting the activation point of the inventive apparatus. A telephone line is connected to the control unit, so that it can automatically pick up on the line and call out to the internally preset phone number and alert the receiver to the flooding condition. A remote acoustic alert device is used for "hearing" when an alarm is being signaled. The remote acoustic alert can be direct-wired or radio-linked.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals denote similar features throughout the several views.

DETAILED DESCRIPTION OF THE DRAWING FIGURES AND PREFERRED EMBODIMENTS

Figure 1:
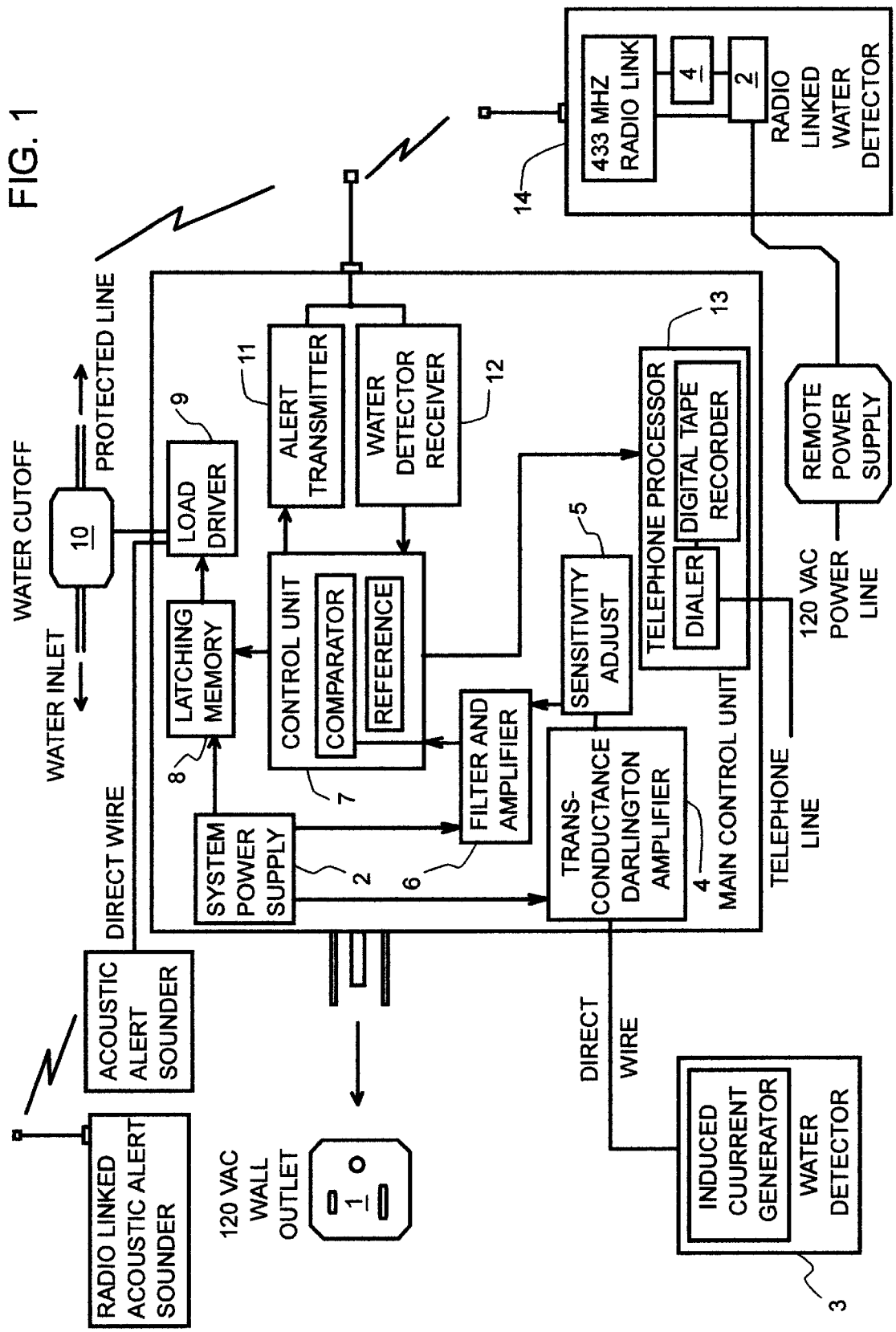
FIG. 1 is a functional block layout showing the fail-safe leak detection and flood prevention apparatus of the present invention.
Figure 2:
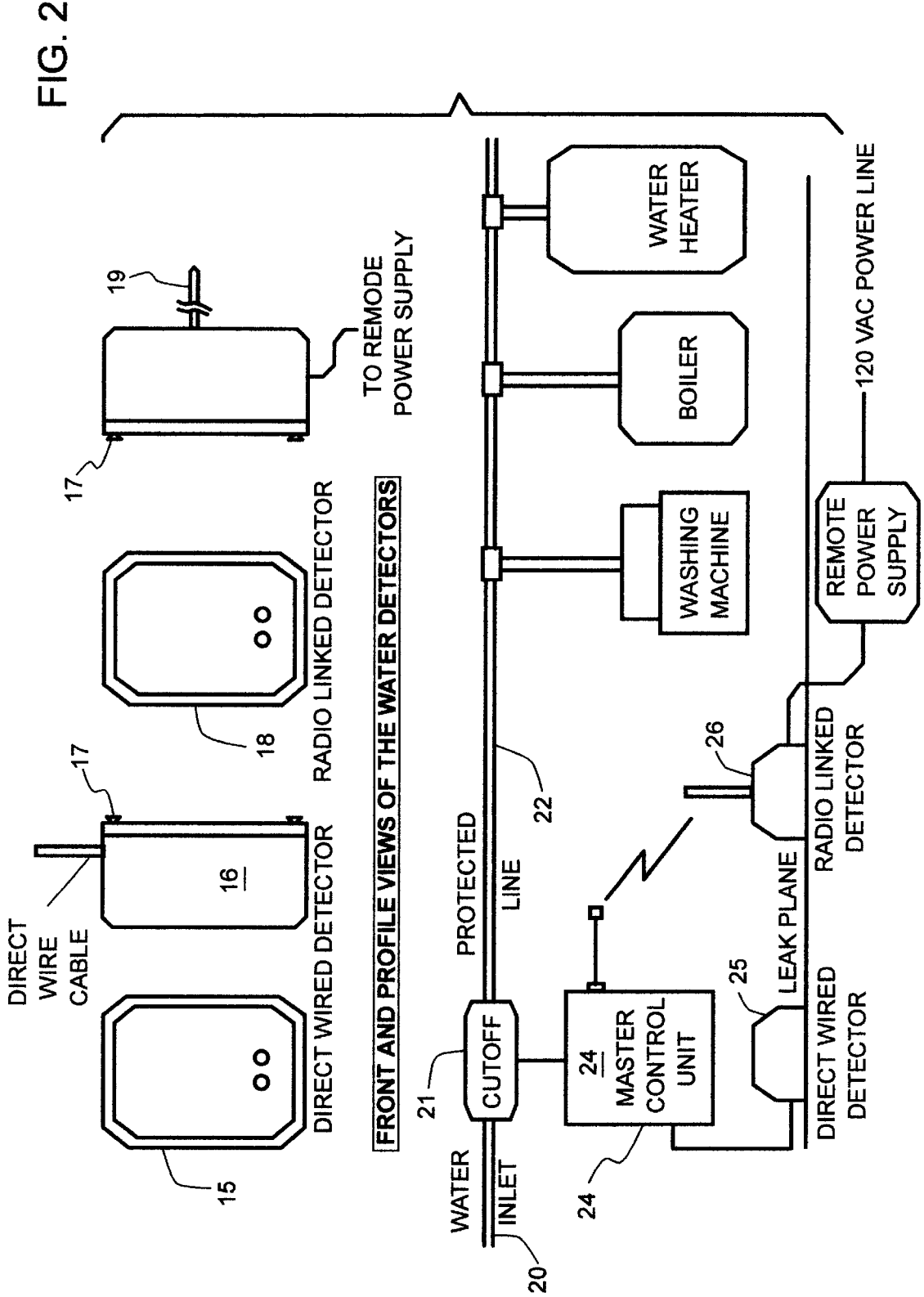
FIG. 2 is a diagram depicting a standing water detector and the placement of the direct-wired, or radio-linked; standing water detector with respect to the devices it is meant to protect from uncontrolled flooding.
Figure 3:
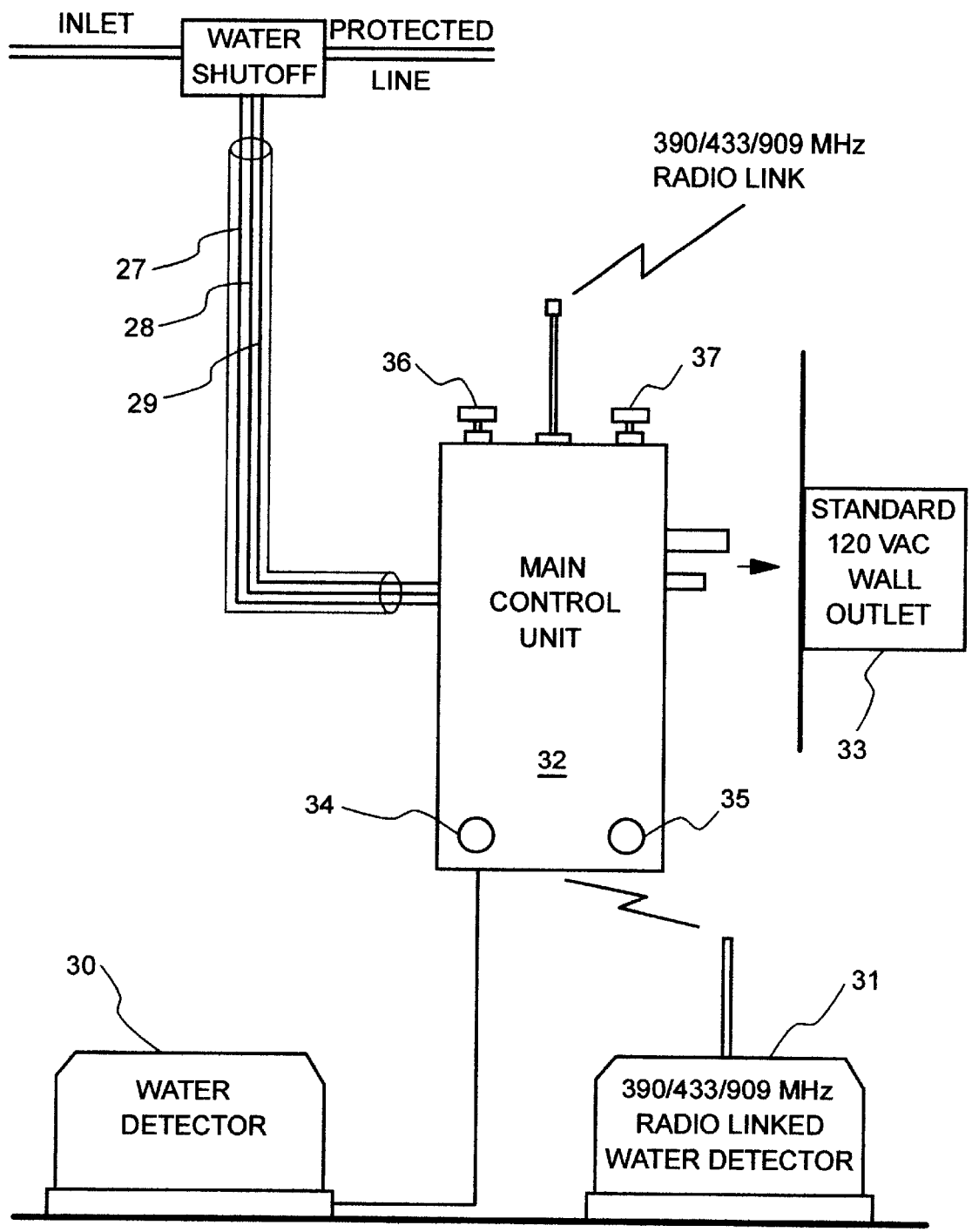
FIG. 3 is a diagram depicting the main control unit and its detailed connection to the water inlet control.
Figure 6:
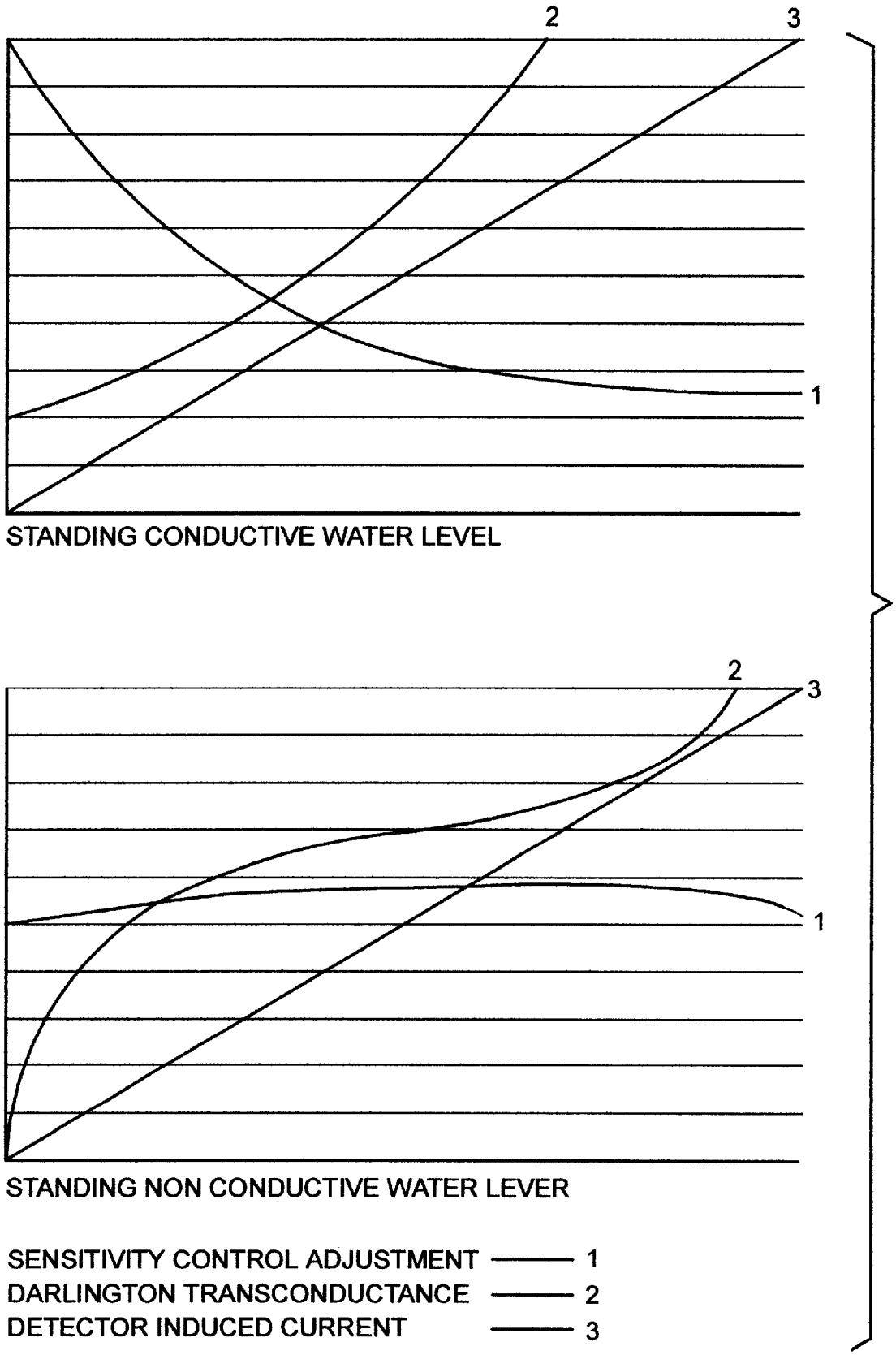

The present invention works on the principle of transconductance shifting by darlington amplification and detection within the standing water detector as can be seen in FIG. 1 and denoted by reference numeral 3. The standing water detector of the present invention, when analyzed as an electrical element, can be broken down to the equivalent circuit elements as seen in FIG. 2 by numeral 15. The response of this new type of standing water detector is described in the transconductance chart A of FIG. 6. As can be seen in FIG. 6, the output response is plotted with respect to the amount of water to which the water detector is exposed.

Block 4 in FIG. 1 represents the transconductance detector portion of the circuit that responds to the amount of water the water detector is exposed to by generating a detectable output proportional to the change in the induced current of the darlington circuit water detector. This principle allows for the system to detect standing water by the transconductance shift and by induced current together. The present invention allows for all conditions of water and types of water to be detected; from highly conductive conventional tap water to non-conductive de-ionized water. The water allows for an induced current shift for conductive liquids and for a transconductance shift for non-conductive liquids.

After the water detector is exposed to some standing water condition, the output of the frequency/phase detector is processed through a sensitivity adjustment, designated by reference numeral 5 of FIG. 1, so that the level required to flag an alarm state is defined for a particular application. The sensitivity adjusted signal is then processed through a stable referenced comparator within the control unit 7 (shown in FIG. 1), that determines whether the standing water detector signal is either above or below the level necessary to flag an alarm condition and shut off the incoming water supply.

Once an alarm level is understood to exist, the control unit 7, within the main control unit trips the latching memory device 8, as illustrated in FIG. 1, that stores the alarm condition and shuts off the incoming water supply 10. Once the latching memory device has memorized, or recorded, an alarm state, it no longer requires electrical power to maintain the memory of the alarm state.

Again referring to FIG. 1, the latching memory device 8 signals the load driver 9 for removing the drive to the water cutoff 10 during an alarm condition.

The present invention creates a fail-safe operation: Should power be lost during an alarmed flood event, the water will be shut OFF; when power returns, the latched memory of the alarm state will maintain the water supply in the OFF state. Only a manual RESET will reinitialize the flow of water and return the alarm memory to the normal state. Should power be lost during a non-alarmed flood event, the water will be shut OFF for the duration of the power loss, however, when power returns, the latched memory of the non-alarmed state will return the water supply to the ON state. It is this philosophy of operation that creates the FAIL-SAFE nature of the system of the present invention, in contrast to the prior art.

Once an alarm state is determined, control unit 7 signals the telephone interface circuit 13 to access the telephone line for a dial tone; dial the internally preset number; and when the receiver of the call picks up the line, the digital tape recorder 13 plays the pre-recorded audio message indicating that a flood condition has been tripped and has been appropriately dealt with.

In a preferred embodiment of the present invention, the remotely-operated water detector, employs the entire transconductance darlington amplifier circuit apparatus, the induced current detector, sensitivity adjust, amplifier and comparator circuitry that energizes a radio link via a selectable 390/433/908 MHz carrier frequency. (See, FIG. 1, reference numeral 14) This device, which is part of the overall apparatus, offers the user the ability to place standing water detectors in places that are either too remote to locate direct-wired water detectors or are otherwise impossible to have wires run to the particular location.

The radio linked standing water detectors 14, shown in FIG. 1, operate internally in exactly the same manner as the ran direct-wired induced current standing water detectors 3. When an alarm condition of standing water needs to be processed, the radio link is energized and transmits a signal, unique to that system's identification number, to the main control units water detector receiver 12. Control unit 7 receives the decoded address as a request to shut off the water supply, and processes the request in the same manner as previously described for the direct-wired water detectors. System security and isolation is maintained by the application of address encoding that provides 1 of 8,192 possible identifications. This ensures that a flood control system in one building will not alert the flood control system of another building within close proximity.

Figure 4:
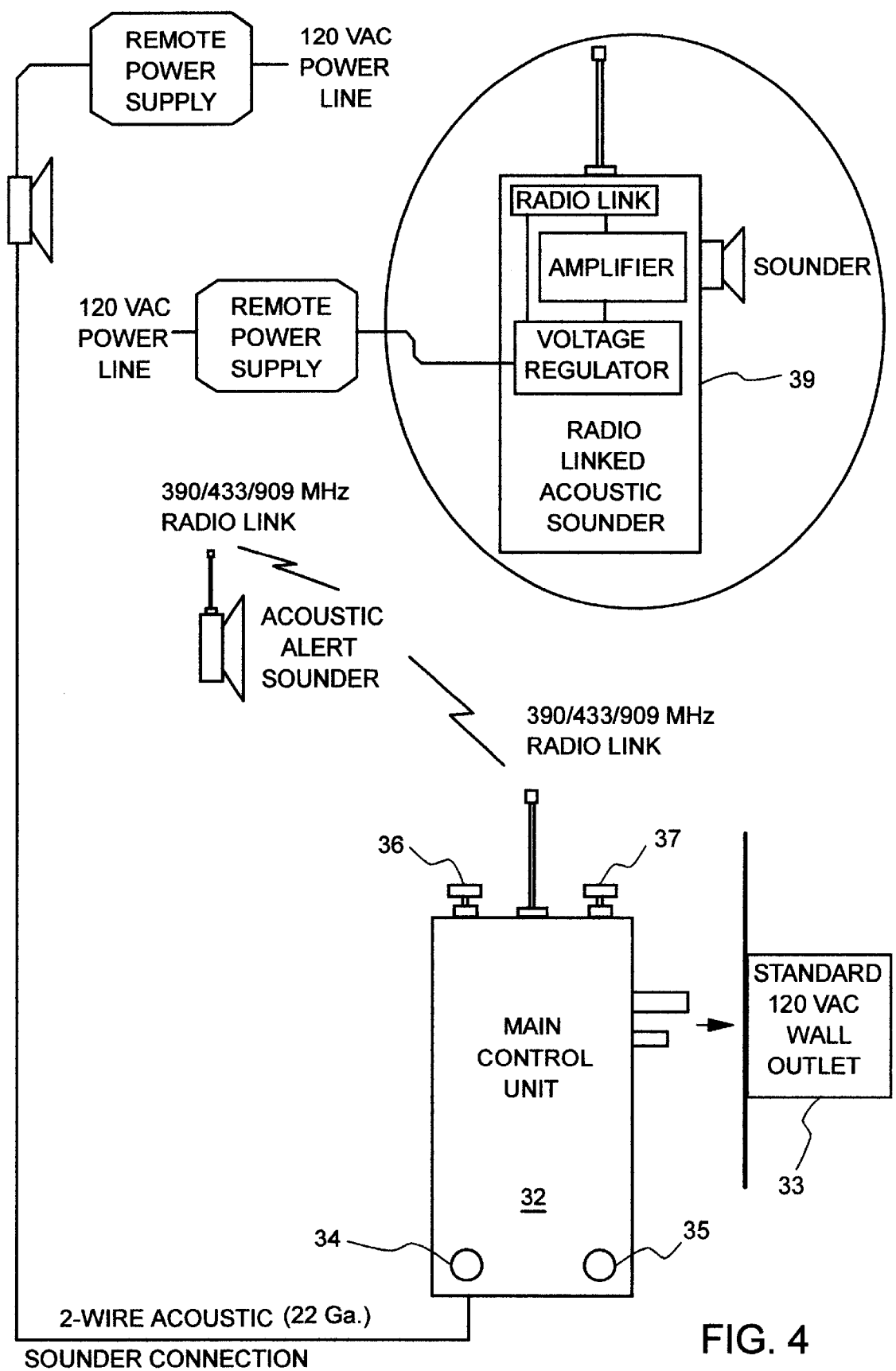
FIG. 4 is a schematic diagram showing the connection scheme for the remote acoustic alert that is either direct-wired or radio-linked.

Referring to FIG. 4, a remote-operated acoustic sounder 39 is shown and is driven by an oscillator/amplifier that is triggered by the radio link receiver. When an alarm state exists, indicating there is a possible flood event in progress, this device allows the user to place the alert device in locations that are, just as in the case with the radio linked water detectors, either too remote to locate a direct-wired acoustic alert, or are simply impossible to run wires to.

The main control unit of the present invention, the moisture-discriminating leak detection and water cutoff system are comprised of the blocks shown in FIG. 1. The elements are the system power supply 2 that generates the ultra-safe filtered direct current for the all the remaining blocks in the system; the transconductance darlington amplifier 4; which receives the standing water level signal for processing; the sensitivity adjust 5, which allows the user to regulate the ability of the system to flag an alarm from a range which spans high humidity to deep standing water; the amplifier circuit 6 that trips the control logic when the control logic reads the standing water level signal level as being high enough to be determined as a leak; the permanent power free alarm memory 8; the water cutoff driver 9; the radio link transmitter 11 to the acoustic alert that signals to personnel that a leak is in progress; the radio linked remote standing water receiver 12 that accepts the transmitted signal from the remote standing water detector; and, the telephone interface processor 13 that allows the system to place a call to a predetermined location to inform the receiver that a leak is in progress. The main control unit, as seen in FIG. 1 is also connected to 3, the standing water detector, by fixed wires, whereas the radio linked standing water detector 14 requires no fixed wiring.

The main control unit, as shown in FIG. 1, is connected to the water cutoff 10, which provides means for shutting off the supply of water under pressure going to the detected leak site. The main control unit is also connected to a standard three-wire, 120V-AC wall socket.

As shown in FIG. 2, object 15 is the transconductive darlington amplifier circuit detector for direct wiring, with a profile of this detector being designated by reference numeral 16. Object 18 is the 100 kHz tuned circuit detector that is equipped with the radio link and antenna module, where reference numeral 19 denotes the profile of the radio linked detector. Each of the detector modules is equipped with an auto-wicking standoff 17 on the rear surface for ease of fixing the placement of the detector in the location where the leak detection must take place, and assuring that the detector will always properly detect a leak in the leak plane.

To set the invention into operation, as can also be seen in FIG. 2, the first requirement is for the direct wired detectors and/or the radio-linked detectors to be placed into position in the appropriate leak plane to detect the presence of leak water from the various source of leaks indicated, possibly a boiler, water heater, a washing machine, etc. Once the standing water detectors are in place, the control unit 24, is wired to the water cutoff 21, and is powered by the main control unit directly when a leak condition is detected. After the standing water detectors and the water cutoff are in place, the main control unit is plugged into a standard 120V-AC wall outlet. The user must set the adjustable sensitivity to the appropriate level so that an alarm condition of the proper severity is detected and any lesser condition is ignored.

The apparatus of the present invention is activated, thereby protecting an entire residence or business when a failure event takes place, i.e., the beginnings of a flood, which may be a ruptured pipe or water heater tank, a failed washing machine supply hose, or even a boiler overflow. The aforementioned failure events begin to accumulate water in a leak plane. (See, FIG. 2 for an example of a leak plane.) When a direct-wired water detector detects a standing water alarm condition in the leak plane, the induced current signal generated by the standing water is relayed to the main control unit that in turn shuts off the incoming water immediately, there by avoiding a flooding event. Where a direct-wired standing water detector is not practical, such as from one floor to the next, or impossible, such as from the outside of a building to the inside thereof, this invention allows for the use of the radio-linked water detectors. When a radio-linked water detector detects a standing water alarm condition, using the same induced current and transconductance technique, the signal generated is relayed to the main control unit water detector receiver 12, by a 390, 433, or 908 MHz carrier signal unit 14 that, in turn, signals the control unit to shut off the incoming water, thereby avoiding a flooding event.

The primary thrust of this invention is to provide fail-safe protection for the installer, so that even when 120V-AC house power is lost, the water is shut off, preventing a flooding event from transpiring during the power loss period. This is accomplished by the present invention employing a normally CLOSED valve, requiring power to allow the flow of water to continue.

Diversion hardware is incorporated into the design of the invention in order to bypass the water cutoff, so that a manual override of the system can be accomplished if the flow of water is needed during such power loss occurrences.

Figure 5:
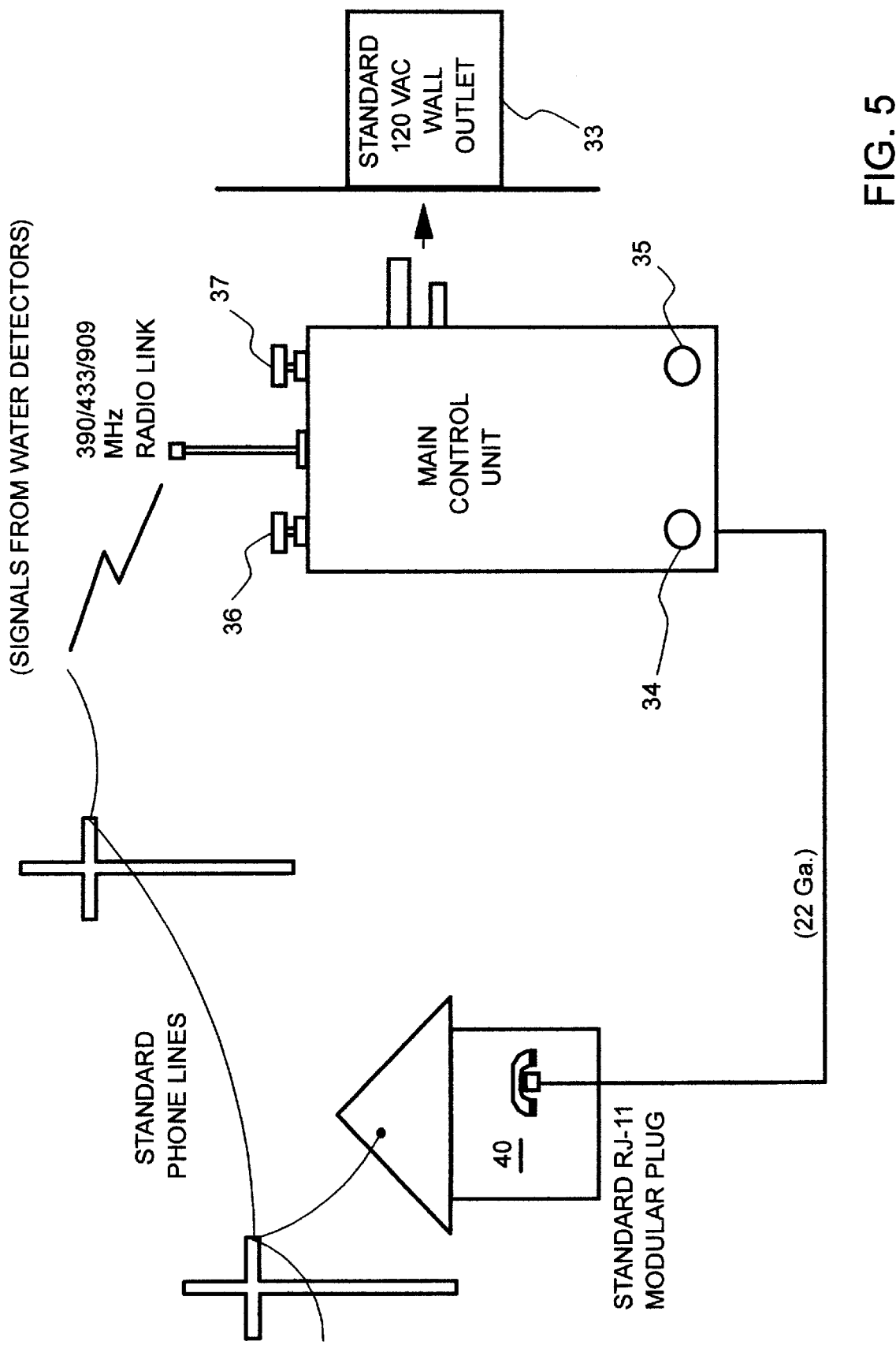
FIG. 5 is a schematic diagram showing the manner in which the control unit is interconnected with a telephone line and the response that the receiver will get; and, FIG. 6 presents graphs comparing the standing conductive water level vs. the standing non-conductive water level, as functions of sensitivity control adjustment, darlington transconductance and detector induced current.

In FIG. 5, it can be seen that a standard two-wire telephone line is connected to the provided RJ-11 modular terminals of the main control unit, so that, if desired, the control unit will initiate a phone call to a predetermined number so that the internally programmed voice message of "flood in progress" (or a message of similar effect) is sent when an alarm condition of a flood event occurs. The receiver of the phone call terminates the incoming call from the location of the leak detection system by pressing, e.g., the #, #, and then the 0 button on the telephone's keypad. The #, #, 0 sequence, by way of example, will cause the leak detection control to disconnect the telephone line, thereby terminating the interface.

Where a direct-wired acoustic alert is not practical, such as from one floor to the next, or impossible, such as from the outside of a building to the inside thereof, the present invention allows for the use of the radio-linked acoustic alerts to sound an alarm during leak events. As can be seen in FIG. 1, the main control unit incorporates block 11 which will transmit the alert status to the acoustic alert sounder via the 390, 433, or 908 MHz radio link. For more detail, FIG. 4 shows the two-lead direct-wiring cable to the acoustics alert sounder as well as the radio link.

The present invention, in keeping with its object of providing "fail-safe" protection, includes means by which the control unit status can be read by illuminated warning indicators. These indicators provide the current states of the incoming 120V-AC power and the leak detection status. This invention, in continuing its main thrust of providing fail-safe protection for the user, provides for a full system test via, e.g., a dual push-button interface. An override TRIP button may be depressed to SHUT OFF the incoming water line to act as a system test. A RESET button may be depressed to reset the alarm condition and reactivate the flow of water from either a system test or from an alarm condition generated shutoff.

FIG. 6 presents graphs comparing the standing conductive water level vs. the standing non-conductive water level, as functions of sensitivity control adjustment, darlington transconductance and detector induced current.

It is submitted that the present invention provides the most flexible, economical and socially acceptable method of accomplishing its task over prior art apparatuses intended for similar purposes. The present invention provides for unequalled safety, accuracy and ease of implementation.

While only several embodiments of the present invention have been shown and described, it will be obvious to those skilled in the art that many modifications may be made to the present invention without departing from the spirit and scope thereof.

What is claimed is:

1. A fail-safe leak detection and flood prevention apparatus, comprising:

an induced current, transconductance darlington amplifier controlled standing water detector mounted at a lowest point of a potential leak plane for sensing variations of standing water conditions on the potential leak plane;

an induced current amplifier in communication with said standing water detector;

a discriminator/sensitivity control device for controlling sensitivity of said standing water detector for humidity, or dampness, level and for detecting a standing water leak, said discriminator/sensitivity control device being in communication with said induced current amplifier;

a latching relay driver connected to said discriminator/sensitivity control device, said latching relay driver being capable of memorizing a leak condition when electrical power is lost;

a control rectifier driven by said latching relay driver, said control rectifier drives a 120-volt AC line voltage load; and, a normally closed 120-volt AC line operated fail-safe water cutoff device connected with said control rectifier, so that when said standing water detector becomes wet, the induced current generated at a detector/water interface feeds said transconductive amplifier for indicating the leak condition, which removes electrical power from said normally closed 120-volt AC line operated fail-safe water cutoff device for shutting off water flow.

2. The fail-safe leak detection and flood prevention apparatus according to claim 1, wherein said induced current generated creates a 1–10 microampere signal which feeds said transconductance darlington amplifier with an adjustable gain of from 100–10,000 for accomplishing a sensitivity selection function for an alarm state.

3. The fail-safe leak detection and flood prevention apparatus according to claim 1, further comprising a system-reset device for reactivating the water flow after the leak condition has been detected and the water flow shut off.

4. The fail-safe leak detection and flood prevention apparatus according to claim 1, further comprising an audio sounder for altering of the leak condition.

5. The fail-safe leak detection and flood prevention apparatus according to claim 4, wherein said audio sounder for altering of the leak condition is electrically hard-wired.

6. The fail-safe leak detection and flood prevention apparatus according to claim 4, wherein said audio sounder for altering of the leak condition is controlled by remote radio.

7. The fail-safe leak detection and flood prevention apparatus according to claim 1, further comprising means for initiating an outgoing telephone call to a predetermined telephone number for warning of the leak condition.

8. The fail-safe leak detection and flood prevention apparatus according to claim 1, wherein said control rectifier is made of four-layer silicon driver.

* * * * *